Oct. 4, 1966 L. E. FENDER 3,276,637
DISPENSER FOR PARTICULATE MATERIAL
Filed Dec. 9, 1963

LAWRENCE E. FENDER
INVENTOR.
BY
BUCKHORN, BLORE, KLARQUIST & SPARKMAN
ATTORNEYS

United States Patent Office 3,276,637
Patented Oct. 4, 1966

3,276,637
DISPENSER FOR PARTICULATE MATERIAL
Lawrence Earl Fender, 617 NE. Channon,
Roseburg, Oreg.
Filed Dec. 9, 1963, Ser. No. 328,940
2 Claims. (Cl. 222—345)

The subject matter of the present invention relates generally to dispensers for particulate material, and in particular to dispensers which measure a predetermined amount of particulate material and then discharge such predetermined amount of material.

The dispenser of the present invention is especially useful for dispensing ground or instant coffee, but also may be used to dispense granulated sugar or other particulate material, such as soap. The dispenser of the present invention has several advantages over conventional dispensers, including a simple and inexpensive construction. The operation of the present dispenser is simpler and more trouble free than conventional dispensers. It also measures predetermined amounts of particulate material more accurately than most previous dispensers. Furthermore, the present dispenser may be operated in a rapid and efficient manner so that very little of the particulate material within the dispenser is spilled or otherwise wasted.

It is therefore one object of the present invention to provide an improved dispenser for accurately measuring and discharging predetermined amounts of particulate material.

Another object of the invention is to provide an improved dispenser for particulate material which is simple and inexpensive in construction.

A further object of the present invention is to provide an improved dispenser of particulate material which transmits predetermined amounts of such material from within the dispenser rapidly and efficiently with little waste.

An additional object of the present invention is to provide an improved dispenser of particulate material which operates in a simple and reliable manner.

Other objects and advantages of the present invention will be apparent following a detailed description of a preferred embodiment thereof and from the attached drawings of which:

Figure 1:
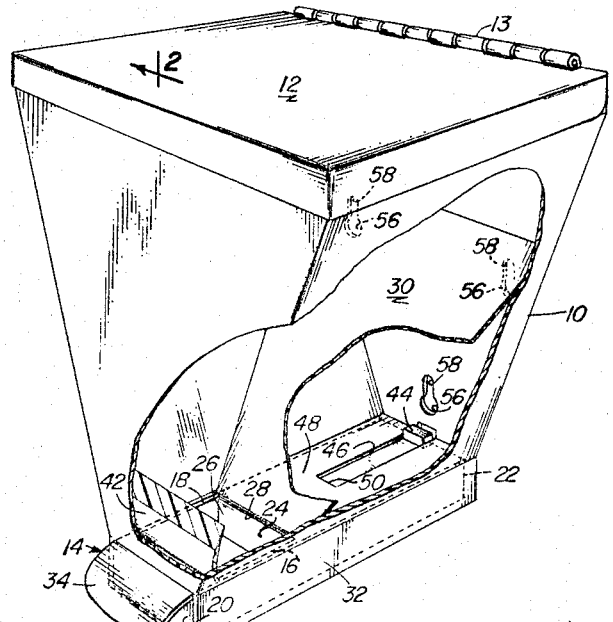
FIG. 1 is a perspective view of one embodiment of the dispenser of the present invention.
Figure 2:
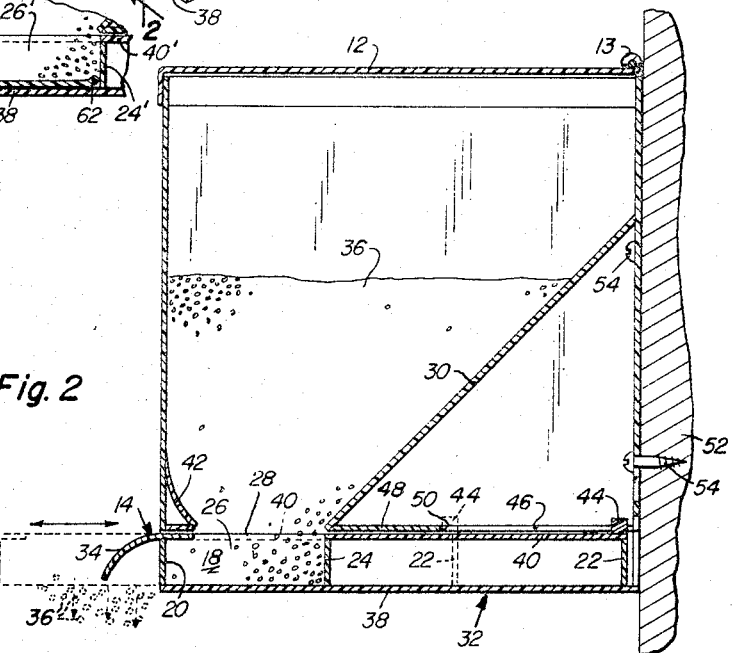
FIG. 2 is a vertical section view taken along the line 2—2 of FIG. 1.
Figure 3:
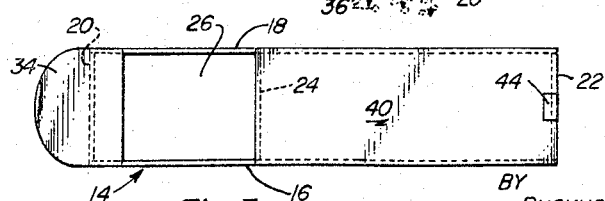
FIG. 3 is a plan view of one embodiment of the measuring device employed in the dispenser of FIGS. 1 and 2.

As shown in FIGS. 1 and 2, the dispenser of the present invention includes a funnel shaped container 10 of molded plastic or other suitable material having a cover 12 mounted by means of a hinge 13 at the top of such container, and a measuring device 14 movably mounted at the bottom of the container. This measuring device may be in the form of the sliding drawer of molded plastic or other suitable material, as shown in FIG. 3, or it may be a suitable rotatable tray measuring device (not shown). The measuring drawer 14 has a pair of rectangular side walls 16 and 18 which are spaced apart and are joined by a pair of end walls 20 and 22 and an intermediate wall 24 positioned between such end walls. The intermediate wall 24 and the end wall 20 form a compartment 26 with the side walls 16 and 18 having a predetermined volume, for example one tablespoon, so that such compartment functions as a measuring cavity.

The container 10 has an outlet opening 28 at the small end of the funnel, in the bottom of such container. This outlet opening is formed by an integral baffle plate 30, inclined at an angle of about 45 degrees with respect to the the drawer 14, and the sides of the container. The measuring drawer 14 is supported below such outlet opening by means of a drawer holder 32 which is in the form of a hollow rectangular box of molded plastic or other suitable material secured to the bottom of the container 10. The drawer holder has open ends to allow sliding movement of the drawer 14 within such holder.

The measuring drawer 14 is provided with a handle 34 secured to the end wall 20 for movement of such drawer between the retracted filling position shown in solid lines and the extended emptying position shown in dotted lines in FIG. 2. In the filling position, an inlet opening through the top of the compartment 26 is in registration with the outlet opening 28 of the container so that a predetermined amount of the particulate material 36 within the container 10 falls into the compartment 26 by gravity. This predetermined amount of material is held within the compartment 26 of the drawer of FIG. 3 when the drawer is in the filling position by a bottom member 38 of the drawer holder since such bottom member extends over the outlet aperture in the bottom of the compartment at this time. When the drawer 14 is pulled forward to the emptying position, shown in dotted lines in FIG. 2, the outlet aperture in the bottom of the compartment 26 is gradually opened to allow particulate material 36 to fall from the compartment as the end wall 20 of the drawer clears the front edge of the bottom member 38 to empty such compartment when the outlet aperture is fully open.

The drawer 14 is provided with a top member 40 which extends from the intermediate wall 24 to the end wall 22 and between the side walls 16 and 18. Therefore, as the drawer is pulled forward to its emptying position, this top member 40 gradually closes the outlet opening 28 at the bottom of the container 10 so that such outlet opening is fully closed when the drawer is in its fully extended emptying position, shown in dotted lines. Thus, the top member 40 prevents additional particulate material from being transmitted from the container at this time, while the particulate material 36 within the compartment 26 is discharged therefrom through the opening in the bottom of the drawer by means of gravity. It should be noted that if the drawer 14 of FIGS. 1 to 3 is moved very slowly it is possible that such drawer can be positioned so that the outlet opening 28 remains partially open while the outlet aperture of the measuring compartment 26 is also partially open so that particulate material can flow continuously from the container 10 through the compartment 26 and on out of the dispenser. However, if the drawer 14 is pulled rapidly from the filling position, shown in solid lines, to the emptying position, shown in dotted lines, and then pushed back to its filling position at a similar fast rate of speed, the amount of particulate material 36 leaving the dispenser will be approximately equal to the volume of the compartment 26.

Of course, the above mentioned problem can be avoided by positioning the outlet opening 28 closer to the rear of the dispenser so that such opening is completely closed before the outlet aperture in the bottom of the compartment begins to open. Also, it should be noted that a rigid curved baffle member or scraper 42 is rigidly attached within the container 10 adjacent the outlet opening for scraping the top of the compartment 26 in the measuring drawer 14 to level the material in such compartment and to help prevent the flow of material directly from the container 10 through the drawer and out of the dispenser when such drawer is in the intermediate position. The handle 34 extends up over the top of the compartment 26 to partially close the inlet opening of such compartment also for this purpose and to prevent particulate material within the compartment from spilling over the top when the drawer is stopped in its extended position.

A stop projection 44 is provided at the rear of the measuring drawer 14 extending from the upper surface of the top member 40. This stop projection 44 slides within an elongated rectangular slot 46 provided in the top portion 48 of the drawer holder 32, and engages the end 50 of the slot to limit further outward movement of the drawer with respect to the drawer holder.

The dispenser of the present invention may be hung on a wall 52 of a building or any other support by means of three screws 54 by inserting the heads of such screws through three spaced holes 56 in the back of the container 10 behind the baffle plate 30. Each of these holes is provided with a slot portion 58 extending upwardly therefrom and having a width substantially equal to the shank of the screws 54 but less than the diameter of the head of the screws in order to enable the dispenser 50 be held by gravity with the shank of the screws positioned within the slot portions 58 of the holes for supporting the dispenser.

Figure 4:
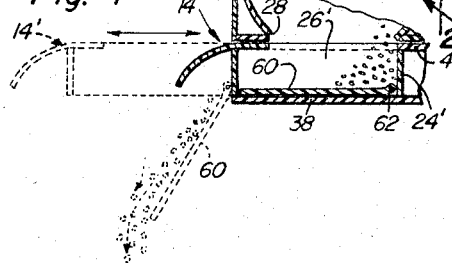
FIG. 4 is a partial section view of another embodiment of the measuring device.

Another embodiment of the measuring drawer is shown in FIG. 4 which is similar to that of FIGS. 1 to 3 so that only the differences will be described. This drawer 14' is provided with a door 60 which is pivotally mounted on pins 62 adjacent the bottom of the intermediate wall 24' so that such door is held up by engagement with the bottom member 38 of the drawer holder. Thus, the door 60 closes the outlet aperture of the measuring compartment in the filling position shown in solid lines and maintains such aperture closed until the drawer 14' is pulled completely to the emptying position shown in dotted lines. When the drawer is in the emptying position with pivot pins adjacent the front edge of the bottom member 38, the door 60 pivots down to open the outlet aperture of the measuring compartment. At this time the top member 40 of the drawer has closed the outlet opening 28 of the container so that no material can ever flow continuously from the container through the measuring compartment and out of the dispenser. Therefore, the drawer in FIG. 4 is superior in this respect to that of FIGS. 1 to 3.

The dispenser of the present invention may be made of metal or other suitable material but it preferably is molded of plastic material so that the container 10 and the drawer holder 32 are formed integral. Of course, the size of the measuring compartment 26 may vary to provide any predetermined amount of particulate material that is desired.

It will be obvious to those having ordinary skill in the art that various changes may be made in the details of the above described preferred embodiments of the present invention without departing from the spirit of the invention. Therefore, the scope of the present invention should only be determined by the following claims.

I claim:
1. A dispenser for particulate material, comprising:
   a funnel shaped container for holding the particulate material having an outlet opening in the small end of said container at the bottom thereof, said container having a back portion adapted to be supported on a wall;
   a cover hinged to the top of said container adjacent the back of said container;
   a measuring drawer having a pair of spaced side walls joined by a pair of spaced end walls and an intermediate wall positioned between said end walls,
   said intermediate wall and one of said end walls forming a measuring compartment with a portion of said walls which has an inlet opening in the top of said compartment and an outlet aperture through the bottom of said compartment;
   said drawer also having a top member extending between said intermediate wall and the other end wall and attached to said side walls as well as a door pivoted to the bottom of said drawer adjacent said intermediate wall and a handle extending outwardly from the front of said container;
   a drawer holder mounted adjacent the bottom of said container for slidably supporting said drawer for sliding movement with respect to the container so that in a filling position the inlet opening of its measuring compartment may be placed beneath the outlet opening of said container for filling said compartment with said material, and in an emptying position, said measuring compartment is moved out of said holder to the exterior of said dispenser and the top member of the drawer remains inside said holder beneath said outlet opening to prevent said material from leaving the container;
   said holder having a bottom member which engages the pivoted door on said drawer to pivot said door up to close said outlet aperture of said compartment when said drawer is in said filling position, but allows the door to pivot down to open said outlet aperture in said emptying position;
   a rigid curved scraper member mounted inside said container inwardly and downwardly from the front of said container to a position adjacent the outlet opening in the bottom of said container so that said scraper member levels the material in said compartment when said drawer is moved to said emptying position; and
   a stop member attached to said drawer and extending through an elongated slot in said drawer holder for engagement with said holder to prevent said drawer from being pulled completely out of said holder.

2. A dispenser for particulate material, comprising:
   a funnel shaped container for holding the particulate material having an outlet opening in the small end of said container at the bottom thereof, said container having a back portion adapted to be supported on a wall;
   a cover hinged to the top of said container adjacent the back of said container;
   a measuring drawer having a pair of spaced side walls joined by a pair of spaced end walls and an intermediate wall positioned between said end walls;
   said intermediate wall and one of said end walls forming a measuring compartment with a portion of said side walls which has an inlet opening in the top of said compartment and an outlet aperture through the bottom of said compartment;
   said drawer also having a top member extending between said intermediate wall and the other end wall and attached to said side walls;
   a drawer holder mounted adjacent the bottom of said container for slidably supporting said drawer for sliding movement with respect to the container so that in a filling position the inlet opening of its measuring compartment may be placed beneath the outlet opening of said container for filling said compartment with said material, and in an emptying position said measuring compartment is moved out of said holder to the exterior of said dispenser and the top member of the drawer remains inside said holder beneath said outlet opening to prevent said material from leaving the container;
   said holder having a bottom member which extends over the outlet aperture of said compartment to close said outlet aperture when said drawer is in said filling position but does not close said outlet aperture in said emptying position;
   a rigid curved scraper member mounted inside said container and extending inwardly and downwardly from the front of said container to said outlet opening in the bottom of said container;
   a handle secured to said drawer and extending outwardly from the front of said container for sliding said drawer between said filling position and said emptying position; and a stop provided on said drawer and extending through an elongated slot in the drawer holder for engagement with said holder in said emptying position to prevent the drawer from being pulled completely out of the holder.

References Cited by the Examiner

UNITED STATES PATENTS

| | | | |
|---|---|---|---|
| 351,483 | 10/1886 | Baldwin | 222—342 X |
| 1,758,999 | 5/1930 | Carns | 222—361 |
| 1,939,900 | 12/1933 | Jagy | 222—342 X |
| 2,077,980 | 4/1937 | Bell | 222—361 X |
| 2,852,167 | 9/1958 | Lempart | 222—361 |
| 2,940,640 | 6/1960 | Erickson | 222—177 |
| 3,056,532 | 10/1962 | Germano | 222—361 |

FOREIGN PATENTS 480,572  5/1953  Italy.

ROBERT B. REEVES, *Primary Examiner.*

LOUIS J. DEMBO, *Examiner.*

H. S. LANE, *Assistant Examiner.*